UNITED STATES PATENT OFFICE 2,076,183

HEAT RESISTING FINISH

Martin Louis Michaud, Detroit, Mich., assignor to Metal Finishing Research Corporation, Detroit, Mich., a corporation of Michigan No Drawing. Application February 25, 1935, Serial No. 8,085

4 Claims. (Cl. 91—70)

This invention relates to a heat resistant finish and more particularly to a finish which may be applied to a properly prepared metal surface and which will give a permanently black finish unaffected by repeated heating up to red heat.

The object of the invention is to provide a finish of this kind which will present a desired black surface and which is not affected by heat up to red heat. Other objects and details of the invention will appear as the description proceeds.

Many different kinds of black finishes for metal which is to be subjected to heat have been employed, but it has been difficult to obtain a permanently black finish satisfactory in all respects.

It has been discovered that a proper composition of sodium silicate thoroughly mixed with black oxide of cobalt can be applied to a properly prepared metal surface. Such a mixture dries readily. Only water is given off, and, therefore, there is no difficulty with objectionable odors due to heating the finish after its application. The black oxide of cobalt most readily obtainable is a mixture of $Co_2O_3$ and $Co_3O_4$.

The preferred form of sodium silicate is a material obtainable on the market under the trade name of Silite. This is a sodium silicate having a specific gravity of 22° Bé. The proportion of soda to silica approximates 1 part of $Na_2O$ to 3.42 parts of $SiO_2$. There is a certain amount of colloidal silica present in this silicate. The high proportion of silica present is quite important, and apparently some of this should be present as colloidal silica. A mixture of this kind is substantially insoluble after setting. In the preferred composition there is also about 1% of sodium chloride.

When such a silicate is applied by itself it shrinks and cracks off when heated. However, when properly loaded with black oxide of cobalt a thin coating of this material completely covers the surface with a black finish that after proper drying may be subjected repeatedly to heating up to red heat and intermediate cooling without affecting the appearance or the adherence of the finish.

The proportion of sodium silicate to black oxide of cobalt may be varied somewhat, but a proportion which has been found satisfactory is 2⅓ gals. of the sodium silicate to 10 lbs. of black oxide of cobalt.

In preparing this finish the black oxide of cobalt must be thoroughly ground with the sodium silicate. It is preferred to perform this grinding with only a portion of the sodium silicate. A good proportion for the grinding is 1 gal. of the sodium silicate to 10 lbs. of black oxide of cobalt. This may be thoroughly ground together in any suitable manner and then thinned with additional sodium silicate to the desired consistency. The grinding may be done satisfactorily in a ball mill equipped with porcelain balls.

Unless the black oxide of cobalt is thoroughly ground and very finely divided, the results are not satisfactory. The black oxide of cobalt may be ground with water and thereafter mixed with the sodium silicate if preferred, but the grinding directly with a portion of the sodium silicate has been found convenient and satisfactory.

If preferred, the dry or solid sodium silicate of proper composition may be mixed with the pigment and filler and wet ground with a minimum of water, and then boiled to dissolve the silicate to form the binder. However, the method described above is preferred.

The best results are obtained with black oxide of cobalt, but the finish may be cheapened somewhat by substituting a black oxide of iron for the black oxide of cobalt without serious detrimental effect. The iron oxide by itself mixed with sodium silicate has been found inferior to the black oxide of cobalt, but very satisfactory results have been obtained with a mixture containing equal parts of black oxide of cobalt and black oxide of iron. Where the black oxide of iron is employed it should be ground with the black oxide of cobalt and in the same manner as described above.

When heated to red heat the black oxide of iron tends to be oxidized so as to become red, but when it is not employed in amounts greater than the oxide of cobalt the color of the cobalt prevails so that the coating remains black in appearance. Of course, the oxide of iron is black also until it has been heated to high temperatures and where the coating is employed under less severe conditions the black oxide of iron may remain black indefinitely.

It will be understood also that other adulterants may be mixed with the black oxide of cobalt so as to give sufficient body to the filler to prevent shrinking and cracking of the sodium silicate when dried and heated. Of course, the filler should be something that will not overcome the black coloring of the oxide of cobalt and preferably is originally black, although this is not an absolute necessity. Graphite or amorphous carbon may be employed also other refractory compounds, preferably black initially.

The above described finish may be used over clean bare metal but the adherence to a smooth metal surface is not entirely satisfactory. Therefore, it is preferable to prepare the surface with a suitable bonding coat.

An iron or steel surface may be prepared by producing thereon a phosphate coating, such as generally referred to as Parkerizing. This coating by itself has not been found to be heat resistant up to red heat, but when covered with the finish above described, heat to that degree does not affect the coating or its adhesion. The finish adheres very well to iron or steel surfaces prepared in this way.

Other coatings having similar characteristics may be produced on iron or steel or upon other metal surfaces and the finish described above may be applied thereto. For satisfactory adhesion it is desirable that the bonding coat shall be substantially integral with the surface of the metal and sufficiently porous to enable the finish to form an intimate bond therewith. In the appended claims, such a coat will be referred to as a "bonding" coat.

The heat resistant finish prepared in this way may be applied to the surface of the metal in any convenient way, but spraying is recommended. Preferably a coating is employed which is only thick enough to produce the desired black finish appearance.

When prepared in the proportions suggested above, the finish dries sufficiently for handling in about fifteen minutes, but at ordinary room temperatures should be allowed to dry several hours before being subjected to high heat. If it is desired to force the drying, temperatures above 200° F. should not be employed until substantially all of the water has been driven off.

Since the finish described above is an aqueous finish, the adhesion is impaired by any grease on the surface of the metal. The surface must be thoroughly cleaned before the finish is applied and where the articles must be handled after cleaning it is preferable to handle them with gloves in order to avoid any contamination from the hands which would lessen the adhesion of the finish.

While somewhat exact proportions have been stated above, it will be understood that some variation may be made from these proportions while retaining much of the advantages of the invention.

What is claimed is:

1. A black finish consisting of sodium silicate, black oxide of cobalt in sufficient quantity to impart a permanently black color when heated up to red heat, and refractory filler preventing shrinking and cracking of the coating when heated.

2. A black finish consisting of sodium silicate, black oxide of cobalt and black oxide of iron, the black oxide of iron being not materially greater in amount than the black oxide of cobalt.

3. The method of finishing a metal surface which comprises forming on the surface of the metal a substantially integral porous bonding coat, applying to this coat a finish consisting of sodium silicate, black oxide of cobalt in sufficient amount to impart a permanently black color when heated to red heat, and refractory filler preventing shrinking and cracking of the coating when heated, and thoroughly drying said finish before heating above 200° F.

4. A black finish consisting of sodium silicate and filler consisting of black oxide of cobalt and black oxide of iron, the sodium silicate having a ratio of approximately 1 part of $Na_2O$ to 3.42 parts of $SiO_2$.

MARTIN L. MICHAUD.